(12) United States Patent
Magnini

(10) Patent No.: US 6,959,531 B2
(45) Date of Patent: Nov. 1, 2005

(54) ADJUSTABLE TRACKED SIDE-DELIVERY HAY RAKE

(75) Inventor: Mario Magnini, Ancona (IT)

(73) Assignee: D. & G. International S.r.l., Ancona (IT)

(*) Notice: Subject to any disclaimer, the term of this patent is extended or adjusted under 35 U.S.C. 154(b) by 0 days.

(21) Appl. No.: 10/716,673

(22) Filed: Nov. 20, 2003

(65) Prior Publication Data
US 2004/0107687 A1 Jun. 10, 2004

(30) Foreign Application Priority Data
Nov. 21, 2002 (IT) .................... AN2002A0056

(51) Int. Cl.⁷ .............. A01D 76/00; A01D 78/00; A01D 80/00; A01D 84/00
(52) U.S. Cl. .................................. 56/365
(58) Field of Search ............. 56/366, 365, 354, 56/6, 14.9, 15.9, 16.1, 16.3, 350, 367, 376, DIG. 21

(56) References Cited

U.S. PATENT DOCUMENTS

| | | | | |
|---|---|---|---|---|
| 4,370,846 A | * | 2/1983 | Arnold | 56/6 |
| 4,753,063 A | * | 6/1988 | Buck | 56/377 |
| 4,922,699 A | * | 5/1990 | Gantzer | 56/367 |
| 4,932,197 A | * | 6/1990 | Allen | 56/377 |
| 4,974,407 A | * | 12/1990 | Rowe et al. | 56/377 |
| 4,996,833 A | * | 3/1991 | Von Allowerden | 56/367 |
| 5,231,829 A | * | 8/1993 | Tonutti | 56/377 |
| 5,263,306 A | * | 11/1993 | Tonutti | 56/377 |
| 5,313,772 A | * | 5/1994 | Tonutti | 56/377 |
| 5,899,055 A | | 5/1999 | Rowse et al. | |
| 5,956,934 A | | 9/1999 | Wright et al. | |
| 6,000,207 A | | 12/1999 | Silvano et al. | |

* cited by examiner

Primary Examiner—Arpad Fabian Kovacs
(74) Attorney, Agent, or Firm—Young & Thompson

(57) ABSTRACT

An adjustable tracked side-delivery hay rake for use in agriculture for collecting the hay in tidy haycoks, is provided with adjustable wheels movable between a raised and narrow position, suitable for transport and based on the presence—on the arms supporting the wheels—of universal joints that allow movements in all directions.

3 Claims, 3 Drawing Sheets

ADJUSTABLE TRACKED SIDE-DELIVERY HAY RAKE

BACKGROUND OF THE INVENTION

The adjustable tracked side-delivery hay rake according to the present invention is an agricultural machine that is to be employed on the fields for collecting the hay in tidy haycoks.

DESCRIPTION OF THE RELATED ART

It is well known that the existing machines have—all or in part—the following features: they have an adjustable width for the passage on the field, they have an adjustable angle of convergence of the side-delivery hay rake wheels; the weight of said wheels is balanced and sprung; the hay rake wheels are movable between two positions: one lowered on the floor for working, one raised from the floor for transport; finally, the wheels are movable between two further positions, sometimes combined with the preceding ones: a large one for working and a narrow one, less encumbrant and suited for transport.

Furthermore, it is known that above mentioned mobility of the wheels of the hay rake and of the relative arms supporting the wheels from a working position to a transport position are sometimes obtained in such machines known to the art, by performing a rotation of each of the ams supporting the wheels around its own axis placed according to the most different directions according to the machine model. All this means that a certain realization complexity is a common feature of nearly all the machines known, as well as a certain uneasiness in manoeuvring and a relatively high realization cost.

SUMMARY OF THE INVENTION

All said inconveniences and functional negativities may be overcome by means of the adjustable tracked side-delivery rack according to the present invention.

Infact, the side-delivery rack according to the present invention is based—for the movements for adjusting the convergence of said wheels as well as for the movement of the relative arms for supporting the wheels between a large and low position for working and a bent and raised position for transport—on the presence—on the arms supporting the wheels of the machine—of universal joints which allow movements in all directions, the realization of pliable side-delivery racks having an easy and comfortable operation as well as being easy in realization and cheap in the realization cost.

BRIEF DESCRIPTION OF THE DRAWINGS

The present invention will be described more in detail hereinbelow relating to the enclosed figures, in which.

DESCRIPTION OF THE PREFERRED EMBODIMENTS

Figure 1:
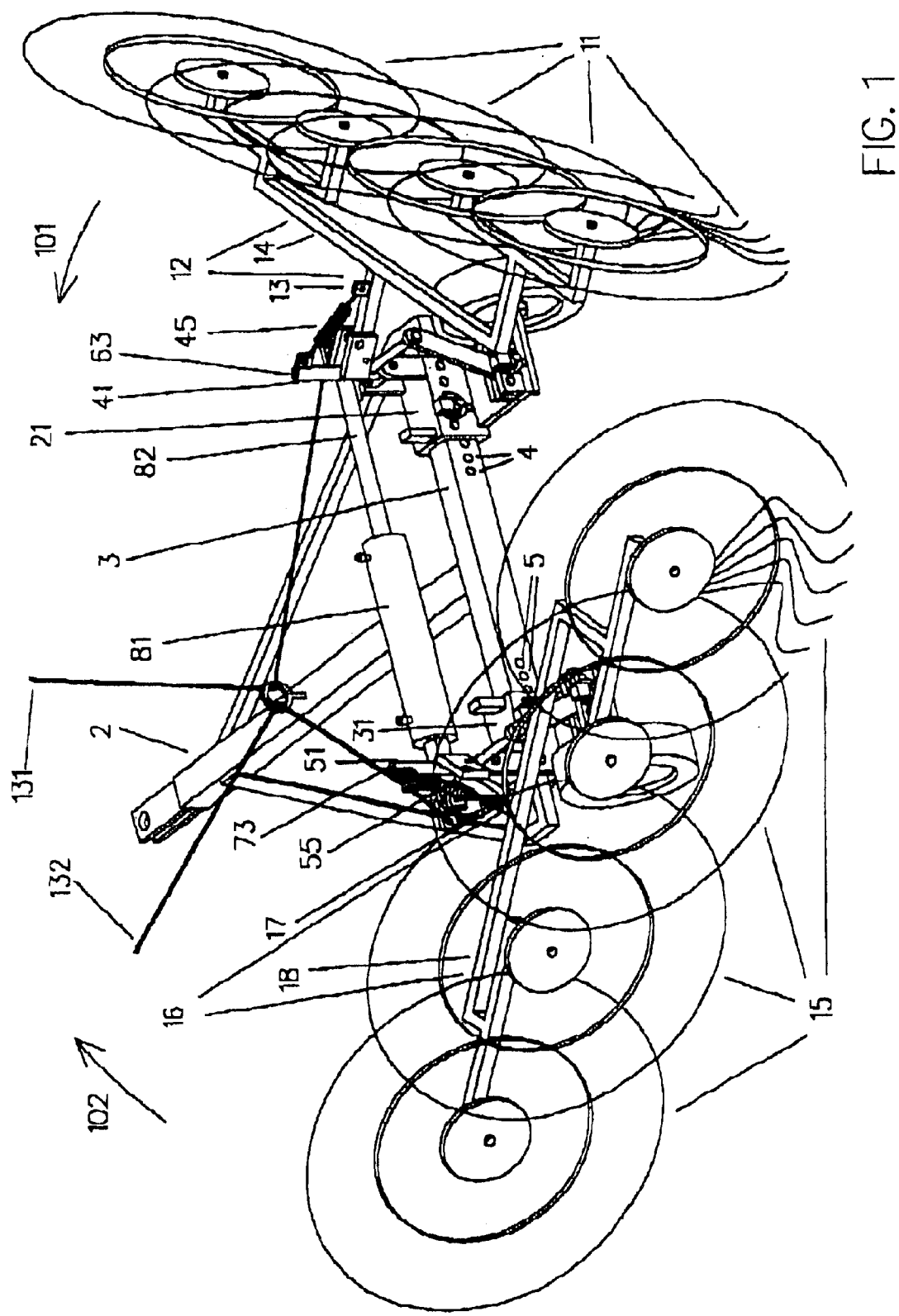
FIG. 1, is a rear axonometric view of a scheme of a possible realization of a preferred embodiment of the side-delivery rack according to the present invention, in working position.

Relating now to the details, the figures show:

a pulling steer 2 and the transversal element 3 provided with a plurality of holes 4 and with a plurality of holes 5;

the right wheels 11 of the side-delivery rack, shown for exemplifying and not limiting purposes in the number of four; the right arm 12 supporting the wheel, consisting of an inner part 13 and of an outer part 14, and said wheels 11 being applied in rotating manner to said outer part 14, and arrow 101 showing the raising direction of said right wheels 11;

the left wings 15 of said side-delivery rack, shown for exemplifying and not limiting purposes in the number of four; the left arm 16 supporting the wheel consisting of an inner part 17 and of an outer part 18, and said wheels 15 being applied in rotating manner to said outer part 18, and an arrow 102 showing the raising direction of said left wheels 15;

the lower right support 21, sliding with respect to the transversal element 3 in the direction of the arrows 22 and 23, provided with a plurality of holes 25, with a plurality of holes 26, with the couple of holes 27, with the notch 87 and with the supporting wheel 28, shown for exemplifying and not limiting purposes in the number of one;

the lower left support 31, sliding with respect to the transversal element 3 in the direction of arrows 32 and 33, provided with the plurality of holes 35, with the plurality of holes 36, with the couple of holes 37, with the notch 88 and with the supporting wheel 38, shown for exemplifying and not limiting purposes in the number of one;

the orientable right head 41 having the shape of a hollow, lengthened bushing, to which an appendix 42 is applied provided with an end 43 and to which the inner part 13 of the right arm 12 supporting the wheel is hinged in a rotable manner by means of a pin 44 and suspended in elastic manner by means of a spring 45, and which is provided with holes 46;

the orientable left head 51 having the shape of a hollow, lengthened bushing, to which an appendix 52 is applied provided with an end 53 and to which the inner part 17 of the left arm 16 supporting the wheel is hinged in a rotable manner by means of a pin 54 and suspended in elastic manner by means of a spring 55, and which is provided with holes 56;

the right intermediate element 61, formed by a bushing 62 to which a first lever 64 is applied provided with an end 65; by a pin 66 that may be inserted into said bushing 62 and into holes 27, thus connecting the right intermediate element 61 to the lower right support 21 in a rotable manner according to arrows 103 and 104, according to a first rotation axis 6 coinciding with the axis of a pin 66; as well as by a pin 63, preferably but not necessarily fixed in a perpendicular way to said bushing 62, and that may be inserted into the orientable right head 41, thus connecting said orientable right head 41 to the right intermediate element 61 in a rotable manner according to arrows 107 and 108, according to a second rotation axis 7 coinciding with the axis of said pin 63;

the left intermediate element 71, formed by a bushing 72 to which a second lever 74 is applied provided with an end 75; by a pin 76 that may be inserted into a bushing 72 and into holes 37, thus connecting the left intermediate element 71 to the lower left support 31 in a rotable manner according to arrows 105 and 106, according to a third rotation axis 8 coinciding with the axis of a pin 76; as well as by a pin 73, preferably but not necessarily fixed in a perpendicular way to said bushing 72, and that may be inserted into the orientable left head 51, thus connecting said orientable left head 51 to the left intermediate element 71 in a rotable manner according to arrows 109 and 110, according to a fourth rotation axis 9 coinciding with the axis of said pin 73;

a hydraulic cylinder 81 with double effect and its stem 82, as said stem 82 is axially extensible and retractile with respect to said hydraulic cylinder 81 with double effect under the action of the same, whereby the end 83 of said stem 82, the end 84 of said cylinder 81 and a pin 85 are connecting said end 83 of said stem 82 in rotable manner to said end 65 of said first lever 64, and a pin 86 connecting in rotable manner said end 84 of said cylinder 81 to said end 75 of said second lever 74;

a right ratchet 91 hinged in rotable manner through a hole 92 onto said pin 85, and provided with an end 93 to be engaged in said notch 87, and also provided with a hole 94, and an arrow 95 showing the raising direction of said right ratchet 91;

a left ratchet 96 hinged in rotable manner through a hole 97 onto said pin 86, and provided with an end 98 to be engaged in said notch 88, and also provided with a hole 99, and an arrow 100 showing the raising direction of said right ratchet 96;

strings 131 and 132 that may be knotted respectively to holes 94 and 99 for raising ratchets 91 and 96 in the direction of arrows 95 and 100;

the right connecting rod 111 provided with a first end 112, in turn provided with a hole 113 that may be inserted from an end 43 of an appendix 42 wit the result of rotably connecting said end 112 of said connecting rod with said appendix 42, and provided with a second end 114 with a hole 115;

the left connecting rod 121 provided with a first end 122, in turn provided with a hole 123 that may be inserted from an end 53 of an appendix 52 wit the result of rotably connecting said end 122 of said connecting rod with said appendix 52, and provided with a second end 124 with a hole 125;

a demountable pin 29 that may be inserted into said holes 4 and 25;

a demountable pin 39 that may be inserted into said holes 5 and 35;

a demountable pin 116 that may be inserted into a hole 115 and into holes 26, with the result of rotably connecting the end 114 of said connecting rod 111 with the lower right support 21;

a demountable pin 126 that may be inserted into a hole 125 and into holes 36, with the result of rotably connecting the end 124 of said connecting rod 121 with the lower right support 31;

a demountable pin 47 that may be inserted into holes 46;

a demountable pin 57 that may be inserted into holes 56;

whereby all said demountable pins are shown in exemplifying and not limiting manner and are of the well known and largely used kind consisting of a rod provided with a swelling on one end and with a transversal hole on the other end, and of a spring plug that may be inserted into said transversal hole.

The hydraulic circuits for operating the hydraulic cylinder 81 with double effect, which are always present in these kinds of machines and of which many kinds are useful for this kind of purpose, are not shown in the figures because they are not relevant for the aim of the present invention.

Relating now to the details shown in the enclosed figures, the working of the machine according to the present invention may be described as follows:

FIG. 1 shows the machine according to the present invention in working position, the wheels open and down.

The angular position of the wheels of the hay rake and of the left and right wheel-supporting arms, are blocked by the constant presence of connecting rods 111 and 121, which contrast any possible rotation according to arrows 107 or 108 of the right rotary head 41, and according to arrows 109 or 110 of the left rotary head 51, as well as of the other parts of the machine according to the present invention connected thereto.

It is possible to vary said angular position by temporarily unstringing the demountable pin 116 from holes 115 and 26, and the demountable pin 126 from holes 125 and 36, thus temporarily releasing the connecting rods 111 and 121; now the wheels of the hay rake and the arms supporting the wheels may be moved into the new, desired position, blocking them anew and inserting again said demountable pins into holes 115 and 26 and in the holes 125 and 36, choosing the most suitable ones.

The width of the passage on the field depends on the position of the right lower support 21 and on the position of the left lower support 31 onto the transversal element 3, and is blocked by the constant presence of the demountable pin 29 inserted in holes 4 and 25 and of the demountable pin 39 inserted in holes 5 and 35.

It is possible to vary said passage width by temporarily unstringing the demountable pin 29 from holes 4 and 25 and the demountable pin 39 from holes 5 and 35, thus temporarily releasing the right lower support 21 and the left lower support 31. Now said elements may be moved into the new desired positions, blocking them anew and inserting again said demountable pins into holes 4 and 25 and into holes 5 and 35, choosing the most suitable ones. The moving into the two directions of the lower right support 21 and left support 31 may be performed advantageously operating in one sense or in another the double effect hydraulic cylinder 81, which thus will move in one sense or into the other all parts of the machine connected to end 83 of the stem 82, and to the end 84 of said cylinder 81.

The weights of the wheels and of the arms supporting the wheels are balanced and sprung due to the presence of springs 45 and 55 and due to the fact that the inner part of the right arm 13 supporting the wheels and the inner part of the left arm 17 supporting the wheels are respectively hinged onto the right rotary head 41 and onto the left rotary head 51; such springing may be eliminated and at the same time the movements of the inner part of the right arm 13 supporting the wheels and of the inner part of the left arm 17 supporting the wheels may be blocked with respect to the right rotary head 41 and to the left rotary head 51, by introducing a demountable pin 47 into holes 46 and a demountable pin 57 into holes 56, which may be useful for preventing undesired movements of shaking of the arms supporting the wheels of the hay rake during the transport operations.

The raising and bending of the wheels and of the arms supporting the right as well as the left wheels, with a passage from the working position to the transport position, is performed by shortening the double effect hydraulic cylinder 81; as a consequence, the end 84 of said cylinder 81 and the end 83 of the stem 82 pull the end 65 of the first lever 64 and the end 75 of the second lever 74, which make rotate inwardly the bushing 62 with the pin 63 as well as the bushing 72 with the pin 73, thus moving also the right rotary head 41 and the left rotary head 51, with all the parts of the machine according to the present invention connected thereto.

Figure 2:
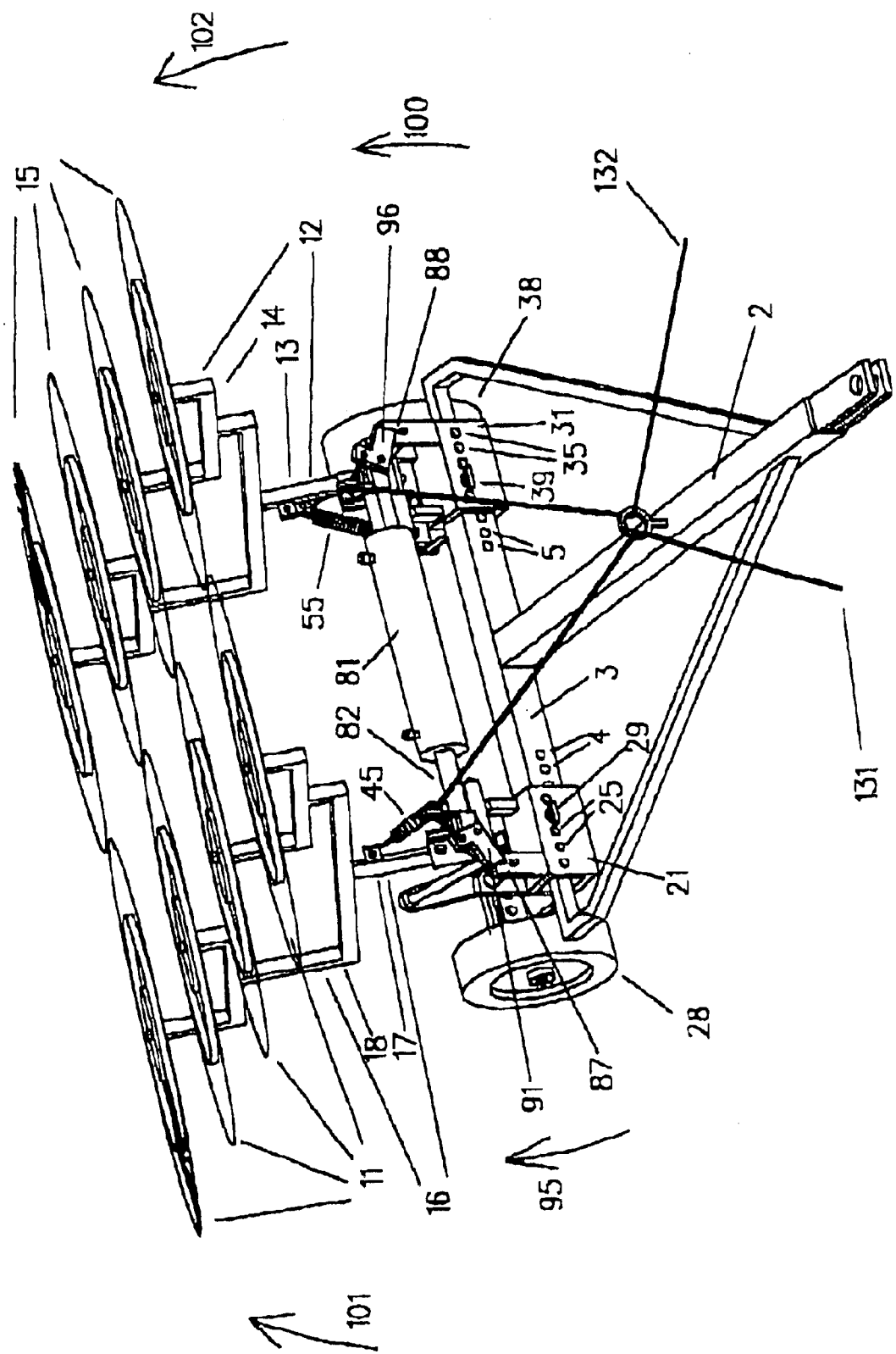
FIG. 2, shows an axonometric front view of the same machine in transport position.
Figure 3:
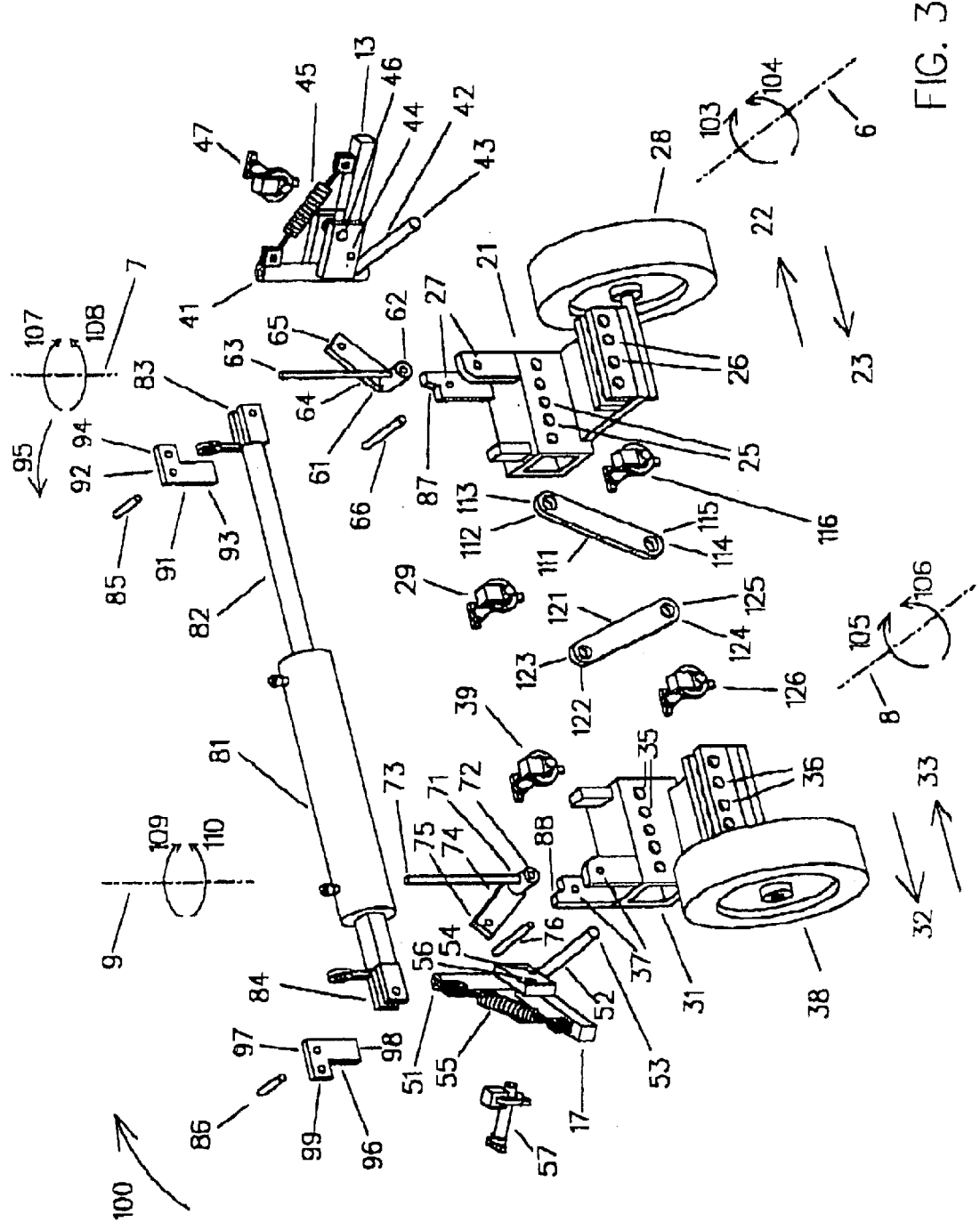
FIG. 3 shows an exploded rear view of the central part of said machine.

The presence of connecting rods 111 and 121 prevents undesired movements of above mentioned parts of the machine: as it imposes a precise position to end 43 of appendix 42 and to end 53 of appendix 52, they force all the parts of the machine connected thereto to get placed in the final transport position shown in FIG. 2.

FIG. 2 shows the side-delivery hay rake according to the present invention in the transport position, the wheels closed and raised.

In said position, the right ratchet 91, under the action of its own weight, automatically places its own end 93 into the notch 87 of the right lower support 2, and the left ratchet 96, under the action of its own weight, automatically places its own weight 98 into the notch 88 of the left lower support 31.

All this prevents translation movements of said notches and therewith any movement of end 65 of the first lever 64 and of end 75 of the second lever 74, maintaining also automatically blocked any other movement of all other parts connected with the machine according to the present invention.

For bringing the machine according to the present invention back to its working position, it is necessary first to release said notches raising them in the direction of arrows 95 and 100 by pulling the strings 131 and 132 respectively knotted to holes 94 and 99; at this point, the operation in the sense of an elongation of the double effect hydraulic cylinder 81 will bring the wheels and the arms supporting the wheels back downwards and in the working position, causing effects different from those described above.

It is obvious that the operations described above may be performed contemporarily on the right and left wheels and arms supporting the wheels of the hay rake, as well as only on the right or on the left parts; so it will be possible to contemporarily use all the wheels of the machine according to the present invention, or just those of one part thereof.

The great advantage of the machine according to the present invention consists in that the existing connections between the right rotary head 41 and the right lower support 21, as well as between the left rotary head 51 and the left support 31, obtained due to the right intermediate element 61 and the left intermediate element 71—due to the kind of working of said intermediate elements based onto contemporary movements around two rotation axis' being preferably but not necessarily perpendicular one to the other—mainly form the universal joints, i.e. joints that allow movements in all directions.

This fact, together with the presence of connecting rods 111 and 121, which allow to limit in a simple and precise manner the unlimited movement possibilities of the universal joints, to the sole desired movements, confers to the side-delivery hay rake according to the present invention not only a great flexibility in operating and regulation, but also in projecting and building, which means that it is easy to realize with a great flexibility of models and versions, so as to satisfy the most different requests and needs.

If desired, the connecting rods 111 and 121 may be provided with further devices—of which may exist and are suitable for the purpose—like e.g. screws, threading and similar which allow the regulation in length; the demountable pins 47 and 57 for blocking the springing movement of arms 12 and 16, may be replaced with any one of the many devices known suitable for the purposes like locks, bolts and similar, without therefore leaving the limits of the present invention.

What is claimed is:

1. An adjustable tracked side-delivery hay rake movable between a working and a transport position, characterized in:

a transversal element;

a right lower support sliding with respect to said transversal element;

means for blocking the sliding between said right lower support and said transversal element;

a right rotary head and an appendix applied to said right rotary head;

a right arm having a first end that may be connected to said right rotary head, and a second end;

a plurality of right wheels of the hay rake that may be applied in rotable manner to said second end of said right arm;

a right intermediate element connected to the lower right support in a manner rotatable around a first rotation axis, and connected to the right rotary head in rotatable manner around the first rotation axis and connected to the right rotary head in rotable manner around a second rotation axis, said first and second rotation axis being perpendicular to each other, and that forms between the right rotary head and the right lower support a universal joint that allows the right rotary head to perform movements in all directions;

a first lever having a first end fixed to said right intermediate element, and a second end;

means for blocking the rotation movements of said right intermediate element with respect to the right lower support;

a left lower support sliding with respect to the transversal element;

means for blocking the sliding between the left lower support and the transversal element;

a left arm having a first end that may be connected to said left rotary head, and a second end;

a plurality of left wheels of the hay rake that may be applied in rotatable manner to said second end of said left arm;

a left intermediate element connected to the left lower support in rotatable manner around a third rotation axis, and connected with the left rotary head in rotatable manner around a fourth rotation axis, whereby said third and fourth rotation axis are perpendicular one to the other, so as to form between the left rotary head and the left lower support a universal joint allowing said left rotary head to move in any direction;

a second lever having a first end fixed to the left intermediate element, and a second end;

means for blocking the rotation elements of the left intermediate element with respect to the left lower support;

a left connection rod with a first end that may be connected in rotatable manner to the appendix of the left rotary head, and a second end that may be connected in rotatable manner to the left lower support;

a double effect hydraulic cylinder for distancing and bringing nearer the second end of the first lever and the second end of the second lever.

2. An adjustable tracked side-delivery hay rake movable between a working and a transport position according to claim 1, characterized in:

the first and the second rotation axis, oblique one to another;

the third and the fourth rotation axis, oblique one to another.

3. An adjustable tracked side-delivery hay rake movable between a working and a transport position according to claim 1, further characterized in:

means for adjusting the length of the left connection rod;

means for adjusting the length of the right connection rod.

* * * * *